United States Patent [19] [11] 4,309,817
Goebel et al. [45] Jan. 12, 1982

[54] METHOD FOR ASSEMBLING AN ELECTROCHEMICAL CELL

[75] Inventors: Franz Goebel, Sudbury; Ibsen R. Hansen, Newton, both of Mass.

[73] Assignee: GTE Products Corporation, Stamford, Conn.

[21] Appl. No.: 145,108

[22] Filed: Apr. 29, 1980

[51] Int. Cl.³ .................. H01M 4/08; H01M 6/00
[52] U.S. Cl. ................... 29/623.1; 29/507; 29/523; 429/128
[58] Field of Search ............ 29/623.1, 623.5, 507, 29/523; 429/128, 196, 218, 167, 168, 169

[56] References Cited

U.S. PATENT DOCUMENTS

| | | | |
|---|---|---|---|
| 1,644,017 | 10/1927 | Hendry | 429/128 |
| 1,786,945 | 12/1930 | Hendry | 29/623.1 |
| 3,069,485 | 12/1962 | Winger et al. | 429/218 |
| 3,116,172 | 12/1963 | Wilke et al. | 429/169 |
| 3,219,487 | 11/1965 | Krouse et al. | 429/169 |
| 3,538,792 | 11/1970 | Stillwagon et al. | 29/507 |
| 3,796,606 | 3/1974 | Lehmann et al. | 429/168 |
| 4,060,668 | 11/1977 | Goebel | 429/218 |
| 4,154,905 | 5/1979 | Urry | 429/128 |
| 4,154,906 | 5/1979 | Bubnick et al. | 429/128 |

FOREIGN PATENT DOCUMENTS

| | | | |
|---|---|---|---|
| 646549 | 10/1962 | Italy | 429/167 |
| 379941 | 7/1973 | U.S.S.R. | 29/623.1 |

Primary Examiner—Daniel C. Crane
Attorney, Agent, or Firm—Peter Xiarhos

[57] ABSTRACT

A method for assembling a primary electrochemical cell including a carbon cathode structure. The carbon cathode structure is assembled by arranging a selected number of individual annular-shaped porous carbon elements, each having an opening extending therethrough, together with an elongated, hollow, cylindrical metal current collector tube so that the carbon elements are in a stacked array and the tube is loosely disposed within and along the openings in the array of carbon elements. The current collector tube is an expandable member and is initially in a non-expanded state and loosely surrounded by the stacked array of carbon elements. A porous separator and an anode structure are then placed around the aforementioned assembly of the carbon elements and the current collector tube, and the resultant assembly, representing a battery stack, is placed within an elongated housing of an electrochemical cell. A tool is then employed to permanently expand the current collector tube outwardly so that the tube makes direct physical contact with the array of carbon elements. An electrolytic solution is placed within the cell in contact with the battery stack and the hollow opening of the tube. The electrolytic solution permeates the carbon elements directly and also by way of a large number of small holes formed in the tube, causing the porous carbon elements to be permeated with the electrolytic solution and expand outwardly. The expansion of the carbon elements causes constituent particles thereof to fill the openings in the current collector thus thereby permanently locking the carbon elements to the current collector tube.

16 Claims, 5 Drawing Figures

METHOD FOR ASSEMBLING AN ELECTROCHEMICAL CELL

CROSS-REFERENCE TO RELATED APPLICATIONS

In co-pending patent application Ser. No. 145,177, now U.S. Pat. No. 4,283,468 filed concurrently herewith in the names of Franz Goebel and Cyril Morgan, and entitled "ELECTROCHEMICAL CELL INSENSITIVE TO PHYSICAL ORIENTATION", there is disclosed and claimed an orientation-insensitive electrochemical cell including a battery stack which may be assembled in accordance with a method disclosed and claimed in the present application.

In co-pending patent application Ser. No. 145,181, filed concurrently herewith in the names of Franz Goebel and Cyril Morgan, and entitled "ELECTROCHEMICAL CELL", there is disclosed and claimed a battery stack assembled in accordance with the method disclosed and claimed in the present invention.

BACKGROUND OF THE INVENTION

The present invention relates to a method for assembling an electrochemical cell and, more particularly, to a method for assembling a primary electrochemical cell having a carbon cathode structure.

Primary electrochemical cells are utilized for a wide variety of applications and are commonly available in a large assortment of sizes and shapes. Furthermore, a number of electrochemical systems are known for incorporation into such primary electrochemical cells. Many of these electrochemical cells utilize a carbon cathode structure. By way of example, in U.S. Pat. No. 4,060,668, in the name of Franz Goebel and assigned to GTE Laboratories Incorporated, there is disclosed an electrochemical system including an anode, a carbon current collector cathode structure, and an electrolytic solution in contact with the anode and the carbon current collector cathode structure. The carbon current collector cathode structure employed in this electrochemical system includes a preformed porous cylindrical carbon structure of a specified length (as determined by the size of the cell), and a twisted metal cathode current collector impressed into and along the carbon structure. The carbon structure comprises an aggregation of a large number of porous semi-rigid globules which are pressed together in a manner to define a multiplicity of electrolyte-conducting channels. By virtue of these channels, the electrolytic solution can diffuse throughout the porous carbon structure and contact the cathodic particles of the structure.

While carbon current collector cathode structures as described hereinabove can be constructed and successfully employed within electrochemical cells, they nonetheless are subject to numerous possible problems and disadvantages. More particularly, the preformed porous carbon structures are inherently fragile and therefore difficult to produce in any reasonable or substantial length (e.g., 2 inches or more) without breaking or falling apart. Further, even when a carbon structure is successfully formed to the desired length, the subsequent act of impressing a metal cathode current collector into the preformed carbon structure, either by twisting or forcing the metal cathode current collector longitudinally into the preformed carbon structure, cannot be controlled with great accuracy. As a result, the mechanical and electrical contact between the twisted metal cathode current collector and the preformed carbon structure may be inadequate to satisfy the stringent requirements and specifications of the electrochemical cell in which such structure is to be used.

BRIEF SUMMARY OF THE INVENTION

In accordance with the present invention, a method is provided for assembling a carbon cathode structure for an electrochemical cell which avoids the problems and disadvantages associated with prior art methods and carbon cathode structures as described hereinabove.

The method in accordance with the present invention includes the initial step of arranging a selected number of individual porous carbon elements, each having an opening extending therethrough defining an interior wall portion, relative to an elongated metal current collector so that the current collector is loosely disposed within and along the openings in the carbon elements and the carbon elements loosely surround the current collector in a stacked array. The current collector employed in this step is a permanently expandable element and is initially in a non-expanded state in which it is spaced from the interior wall portions of the stacked array of carbon elements. The current collector further has a plurality of openings formed therein along its length.

The above step is followed by the step of expanding the elongated current collector outwardly from its initial non-expanded state to a permanently expanded state by an amount to cause the current collector to make direct physical contact with the interior wall portions of the stacked array of carbon elements thereby to secure the array of carbon elements to the current collector.

The above steps may also be employed in assembling an electrochemical cell employing a carbon cathode structure as described hereinabove. In this case, the porous carbon elements are arranged relative to the elongated expandable metal current collector as described hereinabove, and then positioned relative to a porous separator and an anode structure and within an elongated housing of the electrochemical cell with the anode structure being in contact with the porous separator and the porous separator being in contact with the assembly of the stacked array of carbon elements and the current collector. The current collector is then expanded outwardly against the other aforesaid components of the cell to cause the current collector to make direct, permanent physical contact with the interior wall portions of the stacked array of carbon elements thereby to secure the array of carbon elements to the current collector.

An electrolytic solution is then placed into the cell in contact with the aforesaid components of the cell and within the hollow current collector. The electrolytic solution is supplied to the array of carbon elements directly and by way of the openings in the current collector and, due to the porous nature of the carbon elements, causes the carbon elements to be permeated with the electrolytic solution and expand outwardly and fill the openings in the current collector with constituent particles thereof thereby permanently locking the array of carbon elements to the current collector.

BRIEF DESCRIPTION OF THE DRAWING

Various objects, features and advantages of a method for assembling an electrochemical cell including a carbon cathode structure in accordance with the present invention will be apparent from a detailed discussion taken in conjunction with the accompanying drawing in which.

DETAILED DESCRIPTION OF THE INVENTION

Figure 1:
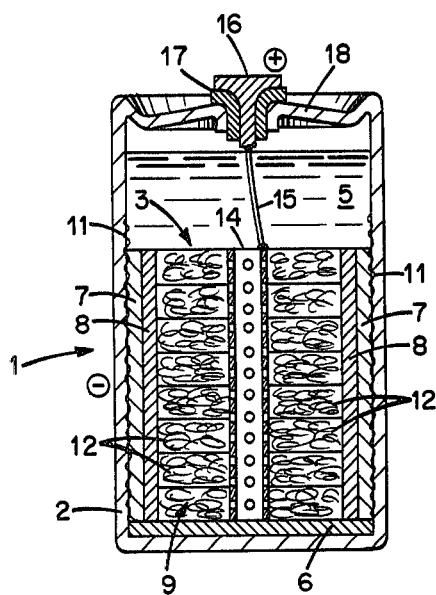
FIG. 1 is an elevational view, partly in cross section, of a primary electrochemical cell employing a carbon cathode structure as assembled in accordance with the method of the present invention.

Referring now to FIG. 1, there is shown a primary electrochemical cell 1 as assembled in accordance with the method of the present invention. As shown in FIG. 1, the electrochemical cell 1 generally includes an elongated metal casing or housing 2, for example, of a cylindrical configuration, within which a battery stack 3 is disposed adjacent to a bottom end thereof. An electrolytic solution 5, for example, in the form of a cathodelectrolyte solution, is provided within the interior of the cell 1 to permeate various portions of the battery stack 3, in a manner to be described in greater detail hereinafter. A suitable and preferred form of the electrolytic solution 5 which is usable with the components of the battery stack 3 (a preferred form of which will be described in greater detail hereinafter), is a cathodelectrolyte solution including a reducible soluble cathode, such as thionyl chloride, and an electrolyte solute, such as lithium tetrachloroaluminate, dissolved in the thionyl chloride.

The battery stack 3 and the electrolytic solution 5 as discussed hereinabove collectively represent the electrochemical system of the cell 1. The battery stack 3 as shown in FIG. 1 is insulated from the housing 2 of the cell 1 by a suitable insulator 6, and generally includes a concentric arrangement of an anode 7, a thin porous separator 8, and a cathode current collector electrode structure 9. The anode 7, which takes the form of a cylindrical sheet and which may be of an oxidizable active alkali metal such as lithium, is connected mechanically and electrically to the housing 2 by means of a fine metal screen or grid 11 which is spot welded to the interior wall of the housing 2 and into which the lithium anode is physically pressed to secure the lithium anode to the screen 11. The electrical connection of the anode 7 to the housing 2 establishes the housing 2, which may be of stainless steel, as the negative terminal for the cell 1.

The aforementioned porous separator 8 is employed to electrically isolate the anode 7 from the cathode current collector electrode structure 9 and typically takes the form of a cylindrical sheet of a standard electrically-nonconductive material such as fiberglass.

The aforementioned cathode current collector electrode structure 9 generally comprises a plurality of annular, or disc-shaped, porous carbon elements 12 arranged directly above each other in a vertical stacked array, and an elongated perforated expandable metal tube 14 disposed within central openings of the elements 12. The tube 14 is connected to a thin metal strip 15 spot welded thereto to a positive terminal 16 of the cell 1.

The metal strip 15, for example, of nickel, is connected (e.g., spot welded) to the terminal 16 by way of a standard insulative glass or ceramic-to-metal seal 17 provided within an hermetically sealed cap 18 of the cell 1.

Figure 2:
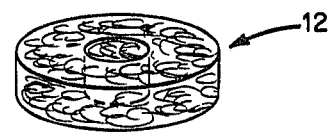
FIGS. 2 and 3 are perspective views of components employed by the carbon cathode structure shown in FIG. 1.

The plurality of porous carbon elements 12, when used with the aforementioned components and specific materials of the cell 1, act as a cathode current collector and as a catalyst where the reduction of the solvent (thionyl chloride) in the cathodelectrolyte solution takes place. Each of the elements 12, the form of which is shown in FIG. 2, is produced by compressing together a plurality of discrete, semi-rigid, porous carbon conglomerates thereby to define a network of electrolyte-conducting channels throughout the element 12. The conglomerates generally contain a combination of carbon black, graphite, and a binder such as "Teflon". By virtue of the small physical size of each of the elements 12, for example, one inch in diameter and one-half inch thickness for a "D"-sized cell, a stacked array of carbon elements of any desirable length may be assembled by simply selecting the required number of elements 12 for the particular size of cell and stacking the elements one atop the other as indicated in FIG. 1. For a "D"-sized cell, for example, eight elements 12 would be sufficient. The use of multiple carbon elements 12 in a stacked array further avoids the fragility and breakage problems associated with the aforedescribed prior art carbon structures in which the carbon structures are formed in one piece, and often of substantial length, and twisted metal current collector elements are forced or screwed into the carbon structures. Techniques for producing the conglomerates employed by the carbon elements 12 are described in detail in U.S. Pat. No. 4,161,063 to which reference may be made for specific details.

Figure 3:
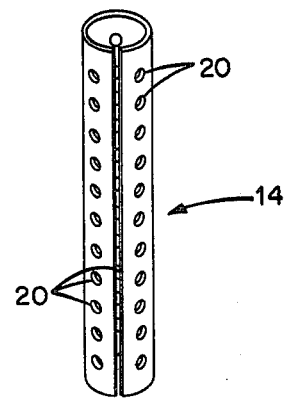
Figure 4:
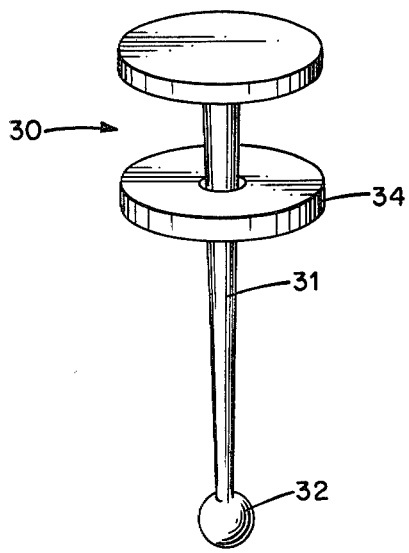
FIG. 4 illustrates a tool employed in the assembly of the electrochemical cell of FIG. 1 in accordance with the method of the present invention.
Figure 5:
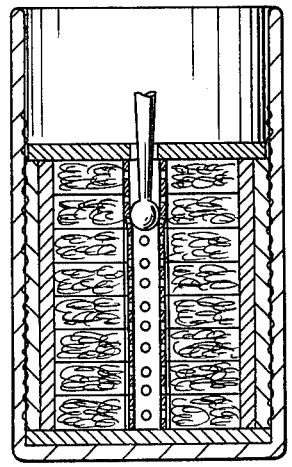
FIG. 5 illustrates an assembly step in accordance with the method of the present invention.

The perforated expandable metal tube 14 employed with the multiple carbon elements 12 as discussed hereinabove takes the specific form as shown in FIG. 3. As shown in FIG. 3, the perforated metal tube 14, which may be of nickel or stainless steel, is split along its entire length to define a generally C-shaped cross section and includes a large number of small openings 20. The openings 20 may be produced by simple metal stamping operations. The tube 14 as shown in FIG. 3 is assembled into the cell 1 together with the other components of the battery stack 3 in the following manner. First, the tube 14 and the requisite number of carbon elements 12 are assembled together so that the tube 14 is loosely disposed within the central openings in the elements 12 and loosely surrounded by the elements 12. The porous separator 8 and the lithium anode 7 (within the grid 11) are then wrapped in succession around the tube/carbon element assembly. The resulting assembly so formed is then placed into the housing 2 of the cell on top of the insulator 6. The tube 14 at this time is in its non-expanded position. A tool 30 as shown in FIG. 4 and including an elongated tapered rod 31 having an integral spherical ball 32 at its end is then used to expand the tube 14. The spherical ball 32 has a diameter larger than the non-expanded diameter of the tube 14 but approximately equal to the desired final expanded diameter of the tube 14. A holder unit 34 loosely carried on the rod 31 is placed and held on top of the abovedescribed assembly, and the rod 31 is progressively advanced down through and along the opening in the tube 14 as generally indicated in FIG. 5, causing the tube 14 to expand outwardly permanently and physically contact adjoining interior wall portions of the carbon elements 12. The action of the tool 30, together with the confinement of the other parts of the battery stack 3 by the housing 2, results in a close physical union between the tube 14 and the array of carbon elements 12. Once the abovedescribed expansion operation has been completed, and with the holder 34 still held on top of the battery stack 3, the rod 31 is withdrawn completely from the tube 14.

Once the battery stack 3 has been assembled as described hereinabove, and once the electrolytic solution 5 (e.g., cathodelectrolyte solution) has been added to the assembled cell 1, the electrolytic solution is able to pass through the openings 20 and the widened slit in the tube 14 and permeate both the carbon elements 12 and the porous separator 8. In addition, the electrolyte solution causes the carbon elements 12 to expand outwardly, or swell (by up to twenty percent), thereby filling the openings 20 in the tube 14 with constituent particles of the carbon elements and establishing an even greater physical permanent union between the tube 14 and the array of carbon elements 12 and also resulting in a more solid, compact, tight battery stack 3 within the cell 1. Further, by virtue of the electrolyte conducting channels in the elements 12, the electrolytic solution is able to penetrate the carbon elements 12 and contact interior cathodic particles, thereby providing substantial active surface areas for increasing the rate capability and cell discharge capacity of the cell 1. During the discharge of the cell 1, the tube 14 electrically contacts the interior portions of the carbon elements 12 to function as a current collector.

The battery stack 3 as described hereinabove, including the cathode current collector electrode structure 9, is disclosed and claimed in the aforementioned co-pending application Ser. No. 145,181.

While there has been described what is considered to be a preferred method of the invention, it will be apparent to those skilled in the art that various changes and modifications may be made therein without departing from the invention as called for in the appended claims.

What is claimed is:

1. A method for assembling a carbon cathode structure for an electrochemical cell, comprising the steps of:
    arranging a selected number of individual porous carbon elements, each having an opening extending therethrough defining an interior wall portion, within and relative to a housing for an electrochemical cell and also relative to an elongated metal current collector so that the current collector is loosely disposed within and along the openings in the carbon elements and the carbon elements loosely surround the current collector in a stacked array within the housing of the cell, said current collector being a hollow elongated metal tube having a central opening along its length and further being permanently expandable and being initially in a non-expanded state in which it is spaced from the interior wall portions of the stacked array of carbon elements, said current collector further having a plurality of openings formed therein along its length; and
    expanding the elongated current collector outwardly from its initial non-expanded state to a permanently expanded state by an amount to cause the current collector to make direct physical contact with the interior wall portions of the stacked array of carbon elements thereby to secure the array of carbon elements to the current collector,
    said step of expanding the current collector comprising the steps of:
        inserting and progressively advancing a tool into and along the central opening of the elongated current collector tube to permanently expand the tube outwardly to cause the expanded tube to make direct physical contact with the interior wall portions of the array of stacked carbon elements; and
    withdrawing the tool from the opening in the current collector.

2. A method in accordance with claim 1 wherein:
the porous carbon elements arranged to surround the current collector each comprise a plurality of compressed semi-rigid porous carbon conglomerates.

3. A method in accordance with claim 2 wherein:
the porous carbon elements are of like size and shape and are arranged in the stacked array directly on top of each other.

4. A method in accordance with claim 3 wherein:
the porous carbon elements are of an annular configuration.

5. A method in accordance with claim 3 wherein:
the elongated current collector tube is generally cylindrical and has a slit along its length defining a generally C-shaped cross section for the tube;
the openings in the carbon elements are circular; and
the tool employed to expand the current collector tube includes a tube-expanding portion of a size greater than the diameter of the current collector tube in its non-expanded state, the size of said tube-expanding portion being selected to sufficiently permanently expand the current collector tube outwardly to make direct physical contact with the interior wall portions of the stacked array of carbon elements.

6. A method in accordance with claim 5 wherein:
the tube-expanding portion of the tool is of a generally spherical configuration.

7. A method for assembling an electrochemical cell comprising the steps of:
    arranging a selected number of individual porous carbon elements, each having an opening extending therethrough defining an interior wall portion, relative to an elongated hollow metal current collector so that the current collector is loosely disposed within and along the openings in the carbon elements and the carbon elements loosely surround the current collector in a stacked array, each of said carbon elements including a network of electrolyte-conducting channels therein for receiving and being permeated by an electrolytic solution and to expand outwardly in response to said electrolytic solution, said current collector being a permanently expandable tube and being initially in a non-expanded state in which it is spaced from the interior wall portions of the stacked array of carbon elements, said current collector tube further having a plurality of openings formed therein along its length;
    positioning a porous separator, an anode structure and the assembly of the stacked array of carbon elements and current collector tube relative to each other and within an elongated housing of the electrochemical cell with the anode structure being in contact with the porous separator and the porous separator being in contact with the assembly of the stacked array of carbon elements and the current collector tube;

expanding the current collector tube outwardly against the other aforesaid components of the cell to cause the current collector tube to make direct permanent physical contact with the interior wall portions of the stacked array of carbon elements thereby to secure the array of carbon elements to the current collector tube, said step of expanding the current collector tube comprising the steps of:
inserting and progressively advancing a tool into and along the central opening of the elongated current collector tube to permanently expand the tube outwardly to cause the expanded tube to make direct physical contact with the interior wall portions of the array of stacked carbon elements; and withdrawing the tool from the opening in the current collector tube; and placing an electrolytic solution into the cell in contact with the aforesaid components of the cell and within the hollow current collector tube, whereby the electrolytic solution is supplied to the electrolyte-conducting channels of the array of carbon elements directly and by way of the openings in the current collector tube, causing the carbon elements to expand outwardly and fill the openings in the current collector tube with constituent particles thereof thereby permanently locking the array of carbon elements to the current collector tube.

8. A method for assembling an electrochemical cell comprising the steps of:

arranging a selected number of individual porous carbon elements, each having an opening extending therethrough defining an interior wall portion, relative to an elongated hollow metal current collector so that the current collector is loosely disposed within and along the openings in the carbon elements and the carbon elements loosely surround the current collector in a stacked array, each of said carbon elements including a network of electrolyte-conducting channels therein for receiving and being permeated by an electrolytic solution and to expand outwardly in response to said electrolytic solution, said current collector being a permanently expandable tube and being initially in a non-expanded state in which it is spaced from the interior wall portions of the stacked array of carbon elements, said current collector tube further having a plurality of openings formed therein along its length;

positioning a porous separator in contact with the assembly of the stacked array of carbon elements and current collector tube;

positioning an anode structure in contact with the porous separator;

inserting the assembly of the anode structure porous separator, stacked array of carbon elements and current collector tube into an elongated housing of the electrochemical cell;

expanding the current collector tube outwardly against the other aforesaid components of the cell to cause the current collector tube to make direct permanent physical contact with the interior wall portions of the stacked array of carbon elements thereby to secure the array of carbon elements to the current collector tube, said step of expanding the current collector tube comprising the steps of:
inserting and progressively advancing a tool into and along the central opening of the elongated current collector tube to permanently expand the tube outwardly to cause the expanded tube to make direct physical contact with the interior wall portions of the array of stacked carbon elements; and withdrawing the tool from the opening in the current collector tube; and placing an electrolytic solution into the cell in contact with the aforesaid components of the cell and within the hollow current collector tube, whereby the electrolytic solution is supplied to the electrolyte-conducting channels of the array of carbon elements directly and by way of the openings in the current collector tube, causing the carbon elements to expand outwardly and fill the openings in the current collector tube with constituent particles thereof thereby permanently locking the array of carbon elements to the current collector tube.

9. A method in accordance with claim 8 wherein:
the porous carbon elements arranged to surround the current collector each comprise a plurality of compressed semi-rigid porous carbon conglomerates defining a network of electrolyte-conducting channels.

10. A method in accordance with claim 9 wherein:
the porous carbon elements are of like size and shape and are arranged in the stacked array directly on top of each other.

11. A method in accordance with claim 9 wherein:
the porous carbon elements are of an annular configuration.

12. A method in accordance with claim 8 wherein:
the elongated current collector is a generally cylindrical tube and has a slit along its length defining a generally C-shaped cross section for the tube;

the openings in the carbon elements are circular; and the tool employed to expand the current collector tube includes a tube-expanding portion of a size greater than the diameter of the current collector tube in its non-expanded state, the size of said tube-expanding portion being selected to permanently expand the current collector tube outwardly by a sufficient amount to make direct physical contact with the interior wall portions of the stacked array of carbon elements.

13. A method in accordance with claim 12 wherein:
the tube-expanding portion of the tool is of a generally spherical configuration.

14. A method in accordance with claim 8 wherein:
the porous carbon elements arranged to surround the current collector are of an annular configuration and each comprise a plurality of compressed semi-rigid porous carbon conglomerates defining a network of electrolyte-conducting channels; and the anode structure and porous separator are generally cylindrical in configuration and are arranged concentrically with each other and with the array of carbon elements and current collector.

15. A method in accordance with claim 14 wherein:
the anode structure includes an oxidizable alkali metal; and the electrolytic solution includes a reducible soluble cathode and an electrolyte solute dissolved in the soluble cathode.

16. A method in accordance with claim 15 wherein:
the oxidizable alkali metal of the anode structure is lithium;

the reducible soluble cathode of the electrolytic solution is thionyl chloride; and the electrolyte solute of the electrolytic solution is lithium tetrachloroaluminate.

* * * * *